(No Model.)
C. PFAUDLER.
PROCESS OF AND APPARATUS FOR PREPARING BEER AND OTHER FERMENTED LIQUIDS FOR THE MARKET.
No. 293,909. Patented Feb. 19, 1884.
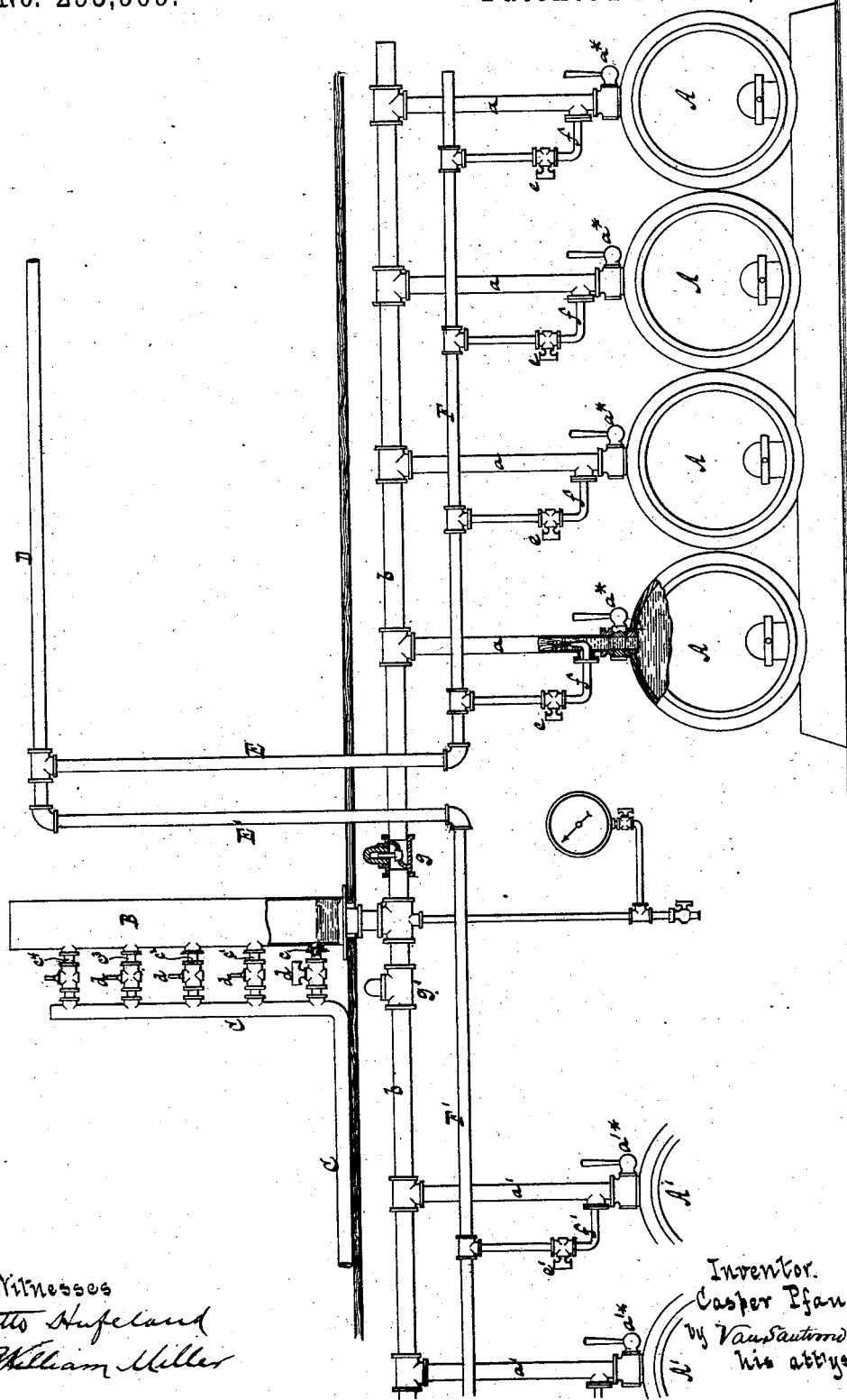
Witnesses
Otto Hufeland
William Miller
Inventor.
Casper Pfaudler
by VanSantvoord & Hauff
his attys.

UNITED STATES PATENT OFFICE.

CASPER PFAUDLER, OF ROCHESTER, NEW YORK.

PROCESS OF AND APPARATUS FOR PREPARING BEER AND OTHER FERMENTED LIQUIDS FOR THE MARKET.

SPECIFICATION forming part of Letters Patent No. 293,909, dated February 19, 1884.

Application filed October 24, 1883. (No model.)

*To all whom it may concern:*

Be it known that I, CASPER PFAUDLER, a citizen of the United States, residing at Rochester, in the county of Monroe and State of New York, have invented new and useful Improvements in Processes of and Apparatus for Preparing Beer and other Fermented Liquids for the Market, of which the following is a specification.

The object of this invention is to prepare beer and other fermentable liquids for the market by holding such liquids during the process of fermentation under controllable hydrostatic pressure, and to carry off the barm as it forms from the mass in the fermenting-vessels by a continuous current of liquid.

The apparatus which I use in carrying out my invention is illustrated in the accompanying drawing, which represents a sectional elevation.

In this drawing, the letters A A A represent a series of fermenting vessels or casks, which are connected by pipes $a\,a\,a$ (which I term the "hydrostatic" pipes) to a pipe, $b$, which extends from the bottom of a vertical tube, B. This tube is filled with water or other liquid, and it is provided with a series of nozzles, $c\,c'\,c^2\,c^3\,c^4$, which communicate with a common discharge-pipe, C. Each of the nozzles is provided with a stop-cock, $d$, and if the nozzle $c$ is opened the liquid in the tube B sinks down to the level of this nozzle; but if this nozzle is closed, and the second nozzle, $c'$, is opened, the liquid in the tube B sinks down to the level of this second nozzle, $c'$, and so on. If the casks A A A are filled with beer or other fermentable liquid, and the stop-cocks $a^*$ in the hydrostatic pipes $a\,a\,a$ are opened, the liquid in the casks is exposed to the pressure of a column of liquid, the height of which can be regulated by means of the nozzles $c\,c'\,c^2\,c^3\,c^4$. I place the tube B at such a level above the casks A A A that if the nozzle $c$ is open the liquid in the casks is exposed to a pressure of, say, five pounds to the square inch. If the nozzle $c'$ is open, the pressure is increased to, say, six pounds to the square inch, and so on.

D is a water-supply pipe, the water supplied by this pipe being under a pressure of, say, fifteen pounds or more to the square inch. This water-supply pipe connects by a vertical pipe, E, with a horizontal pipe, F, from which extend a series of spouts, $f$, one into each of the hydrostatic pipes $a$. The spouts $f$ are provided with stop-cocks $e$, and when these stop-cocks are opened jets of water are injected in an upward direction into the pipes $a$, and the water thus injected flows off through the open nozzle ($c$, for instance) in the tube B. The stop-cocks $e$ also serve to regulate the force of the jets injected into the pipes $a$, and they are only opened just far enough to enable said jets to produce an upward current of the requisite force. The liquid in all the casks, therefore, is held under a hydrostatic pressure of, say, five pounds to the square inch if the nozzle $c$ is open, or six pounds to the square inch if the nozzle $c'$ is open, and so on, as will be readily understood from the foregoing description. The barm as it forms from the fermenting mass contained in the casks A A A enters the hydrostatic pipes $a\,a\,a$, and by the upward currents produced by the jets injected through the spouts $f$ such barm is carried off into the tube B, whence it flows off through the open nozzle $c$ or $c'$, as the case may be, and through the discharge-pipe C.

In the example shown by the drawing, the device for regulating the hydrostatic pressure consists of the tube B and the nozzles $c\,c'\,c^2\,c^3\,c^4$. For this regulator I can substitute a suitably-constructed safety-valve or any other device which will allow of adjusting the pressure, and at the same time permit the barm to flow off.

In the pipe $b$ is placed a check-valve, $g$, which opens outward, so that it yields to the currents produced by the liquid injected through the spouts $f$; but if an accident should happen—for instance, if one of the casks A A A should burst—the check-valve closes and the operation of the regulator B is not disturbed.

In the example shown in the drawing, I have represented two sets of casks, A A A and A' A', connected to the same regulator B. The pipe $b$ extends over the casks A' A' and connects with said casks by pipes $a'$. The water-supply pipe D connects by a vertical pipe, E', with a horizontal pipe, F', which is provided with spouts $f'$, extending into the hydrostatic pipes $a'$. The pipe $b$ is provided with an additional check-valve, $g'$, which closes when an accident happens to one of the casks A'. The water-pipes E' F' are entirely disconnected from the water-pipes E F, so that if one of the casks A should burst, and the stop-cocks $e$ and $a^*$ belonging to this cask are closed, the operation of the remaining casks need not be disturbed; or all the casks A A A can be shut off from communication with the regulator B and with the water-supply pipe D, while the operation of the casks A' A' remains undisturbed. When the fermentation of liquid in one or more of the casks A or A' has been completed, the corresponding stop-cocks $e$ $a^*$ or $e'$ $a'^*$ are closed, and the fermented liquid is ready for the market, since the barm is removed as fast as it forms and the fermented liquid in the casks remains clear and requires no further treatment for the removal or settlement of the barm. In applying my invention to the preparation of beer, for instance, the fermentation is carried on under a hydrostatic pressure of about seven pounds to the square inch, and when the fermentation has been completed, the beer can be drawn from the fermenting-casks directly into the kegs, ready for immediate use.

What I claim as new, and desire to secure by Letters Patent, is—

1. The process of preparing beer and other fermentable liquids for the market, which consists in holding such beer or other liquid during fermentation under a controllable hydrostatic pressure and carrying off the barm which rises from the fermenting mass by a current of liquid, substantially as set forth.

2. The combination, substantially as hereinbefore described, with a fermenting cask or vessel, of a pipe filled with water or other liquid, for holding the liquid in the cask under a hydrostatic pressure, the regulator for controlling this pressure, and the spout $f$, for passing a current of liquid through the hydrostatic pipe and the regulator.

3. The combination, substantially as hereinbefore described, with a series of fermenting casks or vessels, a series of hydrostatic pipes—one for each cask—and the regulator for controlling the pressure in the hydrostatic pipes and in the casks.

4. The combination, substantially as hereinbefore described, with a series of fermenting casks or vessels, a series of hydrostatic pipes—one for each cask—the regulator for controlling this pressure, and the spouts $f$—one for each of the hydrostatic pipes.

5. The combination, substantially as hereinbefore described, with two series of fermenting casks or vessels, A A A A' A', of a series of hydrostatic pipes, $a$ $a'$—one for each cask—the regulator B, connected to all the hydrostatic pipes by a pipe, $b$, the water-supply pipes E F, and spouts $f$, connected to the hydrostatic pipes $a$, and the water-supply pipes E' F' and spouts $f'$, connected to the hydrostatic pipes $a'$.

In testimony whereof I have hereunto set my hand and seal in the presence of two subscribing witnesses.

CASPER PFAUDLER. [L. S.]

Witnesses:
    W. HAUFF,
    E. F. KASTENHUBER.